United States Patent [19]

Blackwell et al.

[11] 4,350,786

[45] Sep. 21, 1982

[54] ORGANOSILANE ANTISTATIC AGENTS FOR GLASS-FILLED POLYARYLENE SULFIDES

[75] Inventors: Jennings P. Blackwell; Richard R. Towers, both of Bartlesville, Okla.

[73] Assignee: Phillips Petroleum Company, Bartlesville, Okla.

[21] Appl. No.: 300,860

[22] Filed: Sep. 10, 1981

[51] Int. Cl.³ .......................................... C08L 81/04
[52] U.S. Cl. ................................. 524/263; 524/261; 524/609; 524/910
[58] Field of Search ................. 260/37 R, DIG. 16; 525/1

[56] References Cited

U.S. PATENT DOCUMENTS

| | | | |
|---|---|---|---|
| 2,870,043 | 1/1959 | Wolinski | 260/DIG. 16 |
| 3,388,102 | 6/1968 | Brizgys | 525/1 |
| 3,702,356 | 11/1972 | Hall | 264/141 |
| 3,834,980 | 9/1974 | Hall | 161/176 |
| 4,176,098 | 11/1979 | Needham | 260/18 R |

OTHER PUBLICATIONS

"The Effect of Silanes on Adhesion of Size Free Glass Fibers in Thermoplastic Composites", Org. Coat Plast. Chem., 40, 538–541, (1979).

*Primary Examiner*—Lewis T. Jacobs
*Attorney, Agent, or Firm*—French, Hughes and Doescher

[57] ABSTRACT

A method for reducing the electrostatic charge build-up in a glass-filled polyarylene sulfide composition by adding either octadecyltriethyoxysilane or octyltrichlorosilane.

6 Claims, No Drawings

ORGANOSILANE ANTISTATIC AGENTS FOR GLASS-FILLED POLYARYLENE SULFIDES

This invention relates to a method for reducing the electrostatic charge in a polyarylene sulfide composition. More particularly this invention relates to the use of certain organosilane antistatic agents to reduce the electrostatic charge resulting from operations on glass-filled polyarylene sulfide based compositions. The organosilane antistatic agents of relevance to this invention are octadecyltriethoxysilane and octyltrichlorosilane.

The addition of silanes to glass-filled polyarylene sulfide compositions is not unknown. For example U.S. Pat. No. 4,176,098 discloses the addition of silanes to an arc resistant composition containing polyphenylene sulfide, glass and clay or talc to improve the water resistance and linear coefficient of expansion of the composition. U.S. Pat. Nos. 3,702,356 and 3,834,980 teach the use of a variety of silanes as coupling agents in thermoplastics. In the above patents the organosilanes of the present invention were nowhere mentioned nor was the potential antistatic utility of any silane taught or suggested. Therefore, it is believed that the present invention represents a clear and substantial contribution to the art and that, accordingly, patent protection is appropriate under the laws of the United States.

A frequently encountered problem associated with the compounding of polyarylene sulfides with various fillers and with dry milling, extrusion, molding and other similar type operations on polyarylene sulfides is the accompanying generation of electrostatic electricity. It has long been desired to at least reduce, if not eliminate, this build-up of electrostatic electricity.

An object of this invention, therefore, is to provide a method for reducing the electrostatic charge in a glass-filled polyarylene sulfide based composition.

Other objects and advantages will become apparent upon a study of the disclosure and appended claims.

It has been found that certain organosilanes such as octadecyltriethoxysilane and octyltrichlorosilane are useful as antistatic agents in glass-filled polyarylene sulfide based compositions. The addition of either of these organosilanes to a glass-filled polyarylene sulfide based composition prior to, during or after subjecting the composition to an operation such as dry milling, extrusion or molding serves to reduce the associated build-up of electrostatic charge.

The scope of the present invention is not intended to be limited in any way to the specific operations mentioned above, but rather, is intended to embrace any operation to which the increase of electrostatic charge in a glass-filled polyarylene sulfide composition can be attributed.

The organosilane antistatic agent may be added to the composition prior to, during or after the operation. Currently, addition prior to the operation is preferred. Accordingly, a composition comprising glass-filled polyarylene sulfide and octadecyltriethyoxysilane or octyltrichlorosilane is especially well suited for use in any operation wherein a build-up of electrostatic charge occurs.

Any uncured or partially cured polyarylene sulfide whether homopolymer, copolymer, terpolymer, and the like, or a blend of such polymers, can be used in the practice of any aspect of this invention. In this application an uncured or partially cured polymer is a polymer the molecular weight of which can be increased by either lengthening of a molecular chain or by cross-linking or by combination of both by supplying thereto sufficient energy, such as heat, preferably in the presence of oxygen. The process which increases the molecular weight of the polymer shall be designated as a curing process. Particularly suited for use in this invention are those polyarylene sulfides having inherent viscosities in chloronaphthalene (0.2 gram polymer in 100 cc chloronaphthalene) at 206° C. (402.8° F.) of at least about 0.08, preferably between about 0.1 and about 0.3, and more preferably about 0.13 and 0.23. Examples of polymers which can be used in this invention are disclosed in U.S. Patent No. 3,354,129. Other examples of polyarylene sulfides are poly(4,4'-biphenylene sulfide); poly(2,4-tolylene sulfide); a copolymer from p-dichlorobenzene, 2,4-dichlorotoluene, and solium sulfide, and blends thereof. Of all of the polyarylene sulfides, polyphenylene sulfide (PPS) polymers are presently preferred for use with the invention.

The weight percentage of the organosilane agent, based upon total weight of the composition, currently preferred in the practice of the present invention ranges from about 0.2 to about 2 weight percent. The scope of this invention, however, encompasses a much broader range and requires only that an amount sufficient to reduce or inhibit electrostatic charge build-up be used.

The weight percentage of glass, based upon total weight of the composition, should be at least about 10 weight percent with the currently preferred range being about 25 to about 60 weight percent.

It is believed that the antistatic utility of the organosilanes is due, at least in part, to the ionic charge distribution within the molecule itself (i.e. ionic charge is located on one end of the molecule with the other end comprising an essentially non-charged hydrocarbon). The above theory is offered only as a possible explanation and should not be construed to limit or further define the scope of the present invention.

Fillers other than glass may be present in the polyarylene sulfide so long as their presence does not negate the antistatic function of the organosilane. By way of example, acceptable fillers include, but are not limited to mica, talc, calcium carbonate and carbon fibers.

Operability of the invention has been demonstrated in a laboratory experiment where various organosilanes were tested for antistatic utility. In each run glass fibers and an organosilane were premixed in a Welex Blender, tumbled with polyphenylene sulfide in a plastic bag, extruded through a 1.5 inch single screw Davis Standard extruder and, finally, dropped through a Wiley mill. The polyphenylene sulfide used is known under the trademark Ryton PR-06 (Phillips Petroleum Co.) and has a melt flow of 120±20 g/min. The composition in each run consisted of 59.6 weight percent polyphenylene sulfide, 39.6 weight percent glass fibers and 0.8 weight percent organosilane. The composition of the control consisted of 60 weight percent polyphenylene sulfide and 40 weight percent glass fibers. The results are tabulated below.

|  | Electrostatic Charge, Coulombs[a] | Grinding Static Build-Up | Molded Properties | |
|---|---|---|---|---|
| 300 Grams Feed plus 0.8 wt. % Organosilane | | | Flexural Strength MPa | Unnotched Izod Impact, J/m |
| 1. Control (No Organosilane) | $-22.8 \times 10^{-7}$ | Yes | 105.3 | 117 |
| 2. Octyltrichlorosilane | $+12.0 \times 10^{-7}$ | No | 68.7 | 84.6 |
| 3. Octadecyltriethyoxysilane | $-5.4 \times 10^{-7}$ | No | 82.2 | 96.0 |
| 4. N-(Trimethoxysilylpropyl)polyethylenimine | — | Yes | 70.1 | 81.5 |
| 5. Vinyl tris-(2-methoxyethoxy)silane | — | Yes | 102.7 | 108.8 |
| 6. 3-Mercaptopropyltrimethoxysilane | — | Yes | 95.3 | 98.3 |

[a]Total static charge build-up in coulombs measured with a Keithley Coulometer. The sign (+ or −) of the charge is unimportant. A high absolute valve indicates a high static charge.

When the control composition (no organosilane) was ground in the Wiley mill a considerable electrostatic charge was produced. The addition of octyltrichlorosilane in the second run and of octadecyltriethoxysilane in the third run successfully inhibited grinding static build-up. It was observed that the compositions of the second and third runs formed, after passage through the mill, neat piles without material sticking to the sides of the collecting container, thus providing further indication of little static charge.

The other organosilanes tested in runs 4–6 did not demonstrate any antistatic utility.

The data also indicate a drop in molded product performance when organosilanes are present. Considering, however, the antistatic advantage this tradeoff is, in most cases, acceptable.

The examples have been provided merely to illustrate the practice of the invention and should not be interpreted to limit the scope of the invention or appended claims in any way.

Reasonable variations and modifications not departing from the essence and spirit of the invention are likewise contemplated to be encompassed within the scope of patent protection desired and sought.

We claim:

1. A method for reducing or inhibiting an electrostatic charge build-up in glass-filled polyarylene sulfide which comprises:
    adding an organosilane antistatic agent selected from the group consisting of octadecyltriethoxysilane and octyltrichlorosilane to said glass-filled polyarylene sulfide in an amount sufficient to counteract an electrostatic charge build-up produced by an operation on said glass-filled polyarylene sulfide.

2. A method in accordance with claim 1 wherein said glass-filled polyarylene sulfide is glass-filled polyphenylene sulfide.

3. A method in accordance with claim 1 wherein 0.2 to 2 weight percent of said organosilane is added to said glass-filled polyarylene sulfide.

4. A method in accordance with claim 2 wherein 0.2 to 2 weight percent of said organosilane is added to said glass-filled polyphenylene sulfide.

5. A method in accordance with claim 1 or 4 wherein said organosilane is octadecyltriethoxysilane.

6. A method in accordance with claim 1 or 4 wherein said organosilane is octyltrichlorosilane.

* * * * *